(12) United States Patent
Chin et al.

(10) Patent No.: US 8,780,867 B2
(45) Date of Patent: Jul. 15, 2014

(54) PACKET-SWITCH HANDOVER IN SIMULTANEOUS TDD-LTE AND TD-SCDMA MOBILE COMMUNICATIONS

(75) Inventors: Tom Chin, San Diego, CA (US); Guangming Shi, San Diego, CA (US); Kuo-Chun Lee, San Diego, CA (US); Steven D. Cheng, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 217 days.

(21) Appl. No.: 13/209,211

(22) Filed: Aug. 12, 2011

(65) Prior Publication Data

US 2012/0257549 A1 Oct. 11, 2012

Related U.S. Application Data

(60) Provisional application No. 61/472,166, filed on Apr. 5, 2011.

(51) Int. Cl.
*H04W 4/00* (2009.01)
(52) U.S. Cl.
USPC ............................. 370/332; 370/331; 455/436
(58) Field of Classification Search
USPC .......................................... 370/280, 216, 269
See application file for complete search history.

(56) References Cited

U.S. PATENT DOCUMENTS

| | | | |
|---|---|---|---|
| 7,643,450 B2 | 1/2010 | Marinescu et al. | |
| 2011/0188471 A1 | 8/2011 | Kim | |
| 2011/0243099 A1 | 10/2011 | Chin et al. | |
| 2011/0244429 A1 | 10/2011 | Waizenegger et al. | |
| 2011/0268083 A1* | 11/2011 | Ostrup et al. | 370/331 |
| 2011/0299429 A1* | 12/2011 | Tiwari | 370/259 |
| 2012/0207011 A1* | 8/2012 | Franklin et al. | 370/216 |
| 2013/0196665 A1* | 8/2013 | Tiwari | 455/436 |

OTHER PUBLICATIONS

International Search Report and Written Opinion—PCT/US2012/032430—ISA/EPO—Sep. 5, 2012.

* cited by examiner

*Primary Examiner* — Albert T Chou
(74) *Attorney, Agent, or Firm* — Kristine U. Ekwueme (57) ABSTRACT

A mobile device capable of communicating on multiple radio access networks simultaneously may concurrently operate calls of a first call type on a first network and a second call type on the second network. As the mobile device approaches the limits of the service area of the second network it may take measurements to result in the call of the second call type to be serviced by the serving cell of the first network which is serving the mobile device for the first call type. In this manner the mobile device may ensure that when it leaves the service area of the second network, the calls of the first call type and second call type are served by the same serving cell in the first network.

20 Claims, 11 Drawing Sheets

PACKET-SWITCH HANDOVER IN SIMULTANEOUS TDD-LTE AND TD-SCDMA MOBILE COMMUNICATIONS

CROSS REFERENCE TO RELATED APPLICATION

This application claims the benefit of U.S. provisional patent application no. 61/472,166 filed Apr. 5, 2011, in the names of CHIN et al., the disclosure of which is expressly incorporated herein by reference in its entirety.

BACKGROUND

1. Field

Aspects of the present disclosure relate generally to wireless communication systems, and more particularly, to an improved method of performing handover of packet-switched calls from a TDD-LTE network to a TD-SCDMA network during a simultaneous ongoing circuit-switched call on TD-SCDMA.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). For example, China is pursuing TD-SCDMA as the underlying air interface in the UTRAN architecture with its existing GSM infrastructure as the core network. The UMTS also supports enhanced 3G data communications protocols, such as High Speed Packet Access (HSPA), which provides higher data transfer speeds and capacity to associated UMTS networks. HSPA is a collection of two mobile telephony protocols, High Speed Downlink Packet Access (HSDPA) and High Speed Uplink Packet Access (HSUPA), that extends and improves the performance of existing wideband protocols.

As the demand for mobile broadband access continues to increase, research and development continue to advance the UMTS technologies not only to meet the growing demand for mobile broadband access, but to advance and enhance the user experience with mobile communications.

SUMMARY

In one aspect, a method of wireless communication is disclosed. The method includes communicating with a first radio access network during a call of a first call type and communicating with a second radio access network during a call of a second call type. The second radio access network is sent a signal measurement for a serving cell of the first radio access network. An indication is received from the second radio access network to communicate with the serving cell of the first radio access network for the call of the second call type.

Another aspect discloses a user equipment configured for wireless communication. The user equipment includes means for communicating with a first radio access network during a call of a first call type. Also included is means for communicating with a second radio access network during a call of a second call type. A means for sending the second radio access network a signal measurement for a serving cell of the first radio access network is also included. The user equipment also includes a means for receiving an indication from the second radio access network to communicate with the serving cell of the first radio access network for the call of the second call type.

In another aspect, a computer program product for wireless communications in a wireless network is disclosed. The computer readable medium has program code recorded thereon which, when executed by the processor(s), causes the processor(s) to perform operations of communicating with a first radio access network during a call of a first call type and communicating with a second radio access network during a call of a second call type. The program code also causes the processor(s) to send the second radio access network a signal measurement for a serving cell of the first radio access network. The program code causes the processor(s) to receive an indication from the second radio access network to communicate with the serving cell of the first radio access network for the call of the second call type.

Another aspect discloses wireless communication having a memory and at least one processor coupled to the memory. The processor(s) is configured to communicate with a first radio access network during a call of a first call type and to communicate with a second radio access network during a call of a second call type. The processor(s) is configured to send the second radio access network a signal measurement for a serving cell of the first radio access network. The processor(s) is also configured to receive an indication from the second radio access network to communicate with the serving cell of the first radio access network for the call of the second call type.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
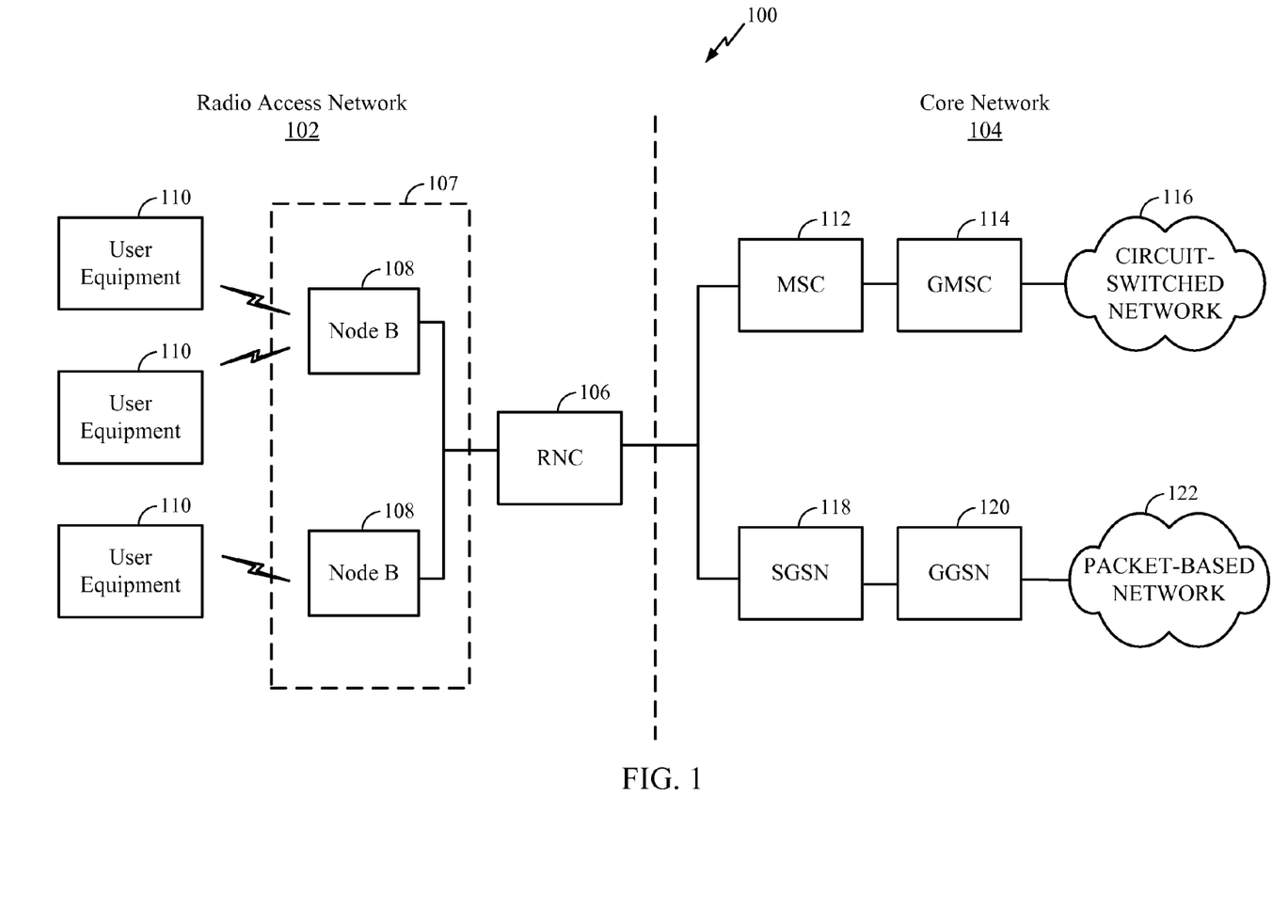
FIG. 1 is a block diagram conceptually illustrating an example of a telecommunications system.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a (radio access network) RAN 102 (e.g., UTRAN) that provides various wireless services including telephony, video, data, messaging, broadcasts, and/or other services. The RAN 102 may be divided into a number of Radio Network Subsystems (RNSs) such as an RNS 107, each controlled by a Radio Network Controller (RNC) such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two node Bs 108 are shown; however, the RNS 107 may include any number of wireless node Bs. The node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a tablet, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the node Bs 108. The downlink (DL), also called the forward link, refers to the communication link from a node B to a UE, and the uplink (UL), also called the reverse link, refers to the communication link from a UE to a node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine the UE's location and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a node B 108 and a UE 110, but divides uplink and downlink transmissions into different time slots in the carrier.

Figure 2:
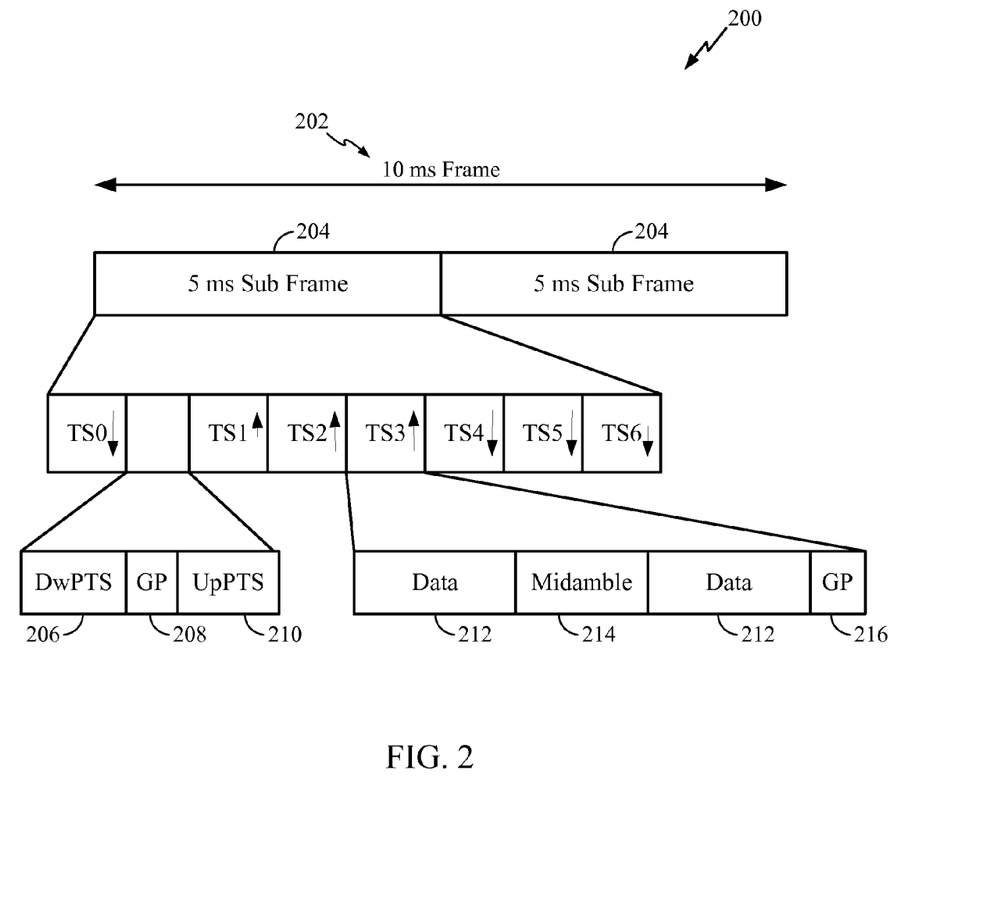
FIG. 2 is a block diagram conceptually illustrating an example of a frame structure in a telecommunications system.

FIG. 2 shows a frame structure 200 for a TD-SCDMA carrier. The TD-SCDMA carrier, as illustrated, has a frame 202 that is 10 ms in length. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. In the example illustrated, TS1-TS3 are allocated for uplink and TS4-TS6 are allocated for downlink. A downlink pilot time slot (DwPTS) 206, a guard period (GP) 208, and an uplink pilot time slot (UpPTS) 210 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 212 separated by a midamble 214 and followed by a guard period (GP) 216. The midamble 214 may be used for features, such as channel estimation, while the GP 216 may be used to avoid inter-burst interference. The chip rate in TD-SCDMA is 1.28 Mcps.

Figure 3:
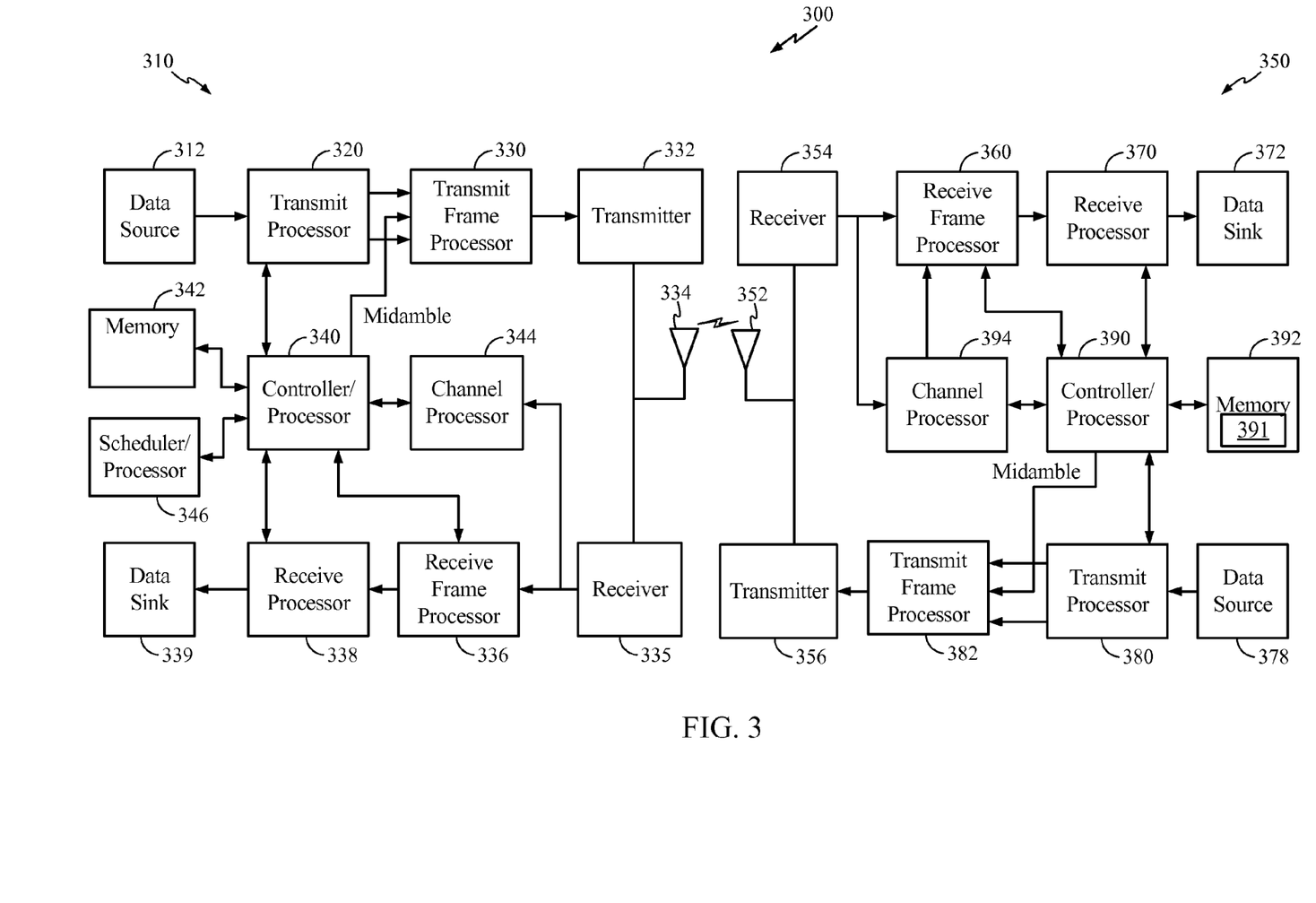
FIG. 3 is a block diagram conceptually illustrating an example of a node B in communication with a UE in a telecommunications system.

FIG. 3 is a block diagram of a node B 310 in communication with a UE 350 in a RAN 300, where the RAN 300 may be the RAN 102 in FIG. 1, the node B 310 may be the node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the node B 310. More specifically, the receive processor 370 descrambles and despreads the symbols, and then determines the most likely signal constellation points transmitted by the node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receiver processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the node B 310 or from feedback contained in the midamble transmitted by the node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the node B 310 in a manner similar to that described in connection with the receiver function at the UE 350. A receiver 335 receives the uplink transmission through the antenna 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an acknowledgement (ACK) and/or negative acknowledgement (NACK) protocol to support retransmission requests for those frames.

The controller/processors 340 and 390 may be used to direct the operation at the node B 310 and the UE 350, respectively. For example, the controller/processors 340 and 390 may provide various functions including timing, peripheral interfaces, voltage regulation, power management, and other control functions. The computer readable media of memories 342 and 392 may store data and software for the node B 310 and the UE 350, respectively. For example, the memory 392 of the UE 350 may store a signal measurement scheduling module 391 which, when executed by the controller/processor 390, configures the UE 350 for dual mode operation for packet-switch handover. A scheduler/processor 346 at the node B 310 may be used to allocate resources to the UEs and schedule downlink and/or uplink transmissions for the UEs.

Certain mobile equipment may be configured to allow for operation on multiple wireless communication networks. For example, a UE may be capable of operating either on a TD-SCDMA/GSM network or on a TDD-LTE (Time Division Duplexed-Long Term Evolution) network. Certain situations may direct the UE to communicate on one particular available network. For example, a multi-mode UE capable of communicating on either TD-SCDMA or on TDD-LTE may wish to connect to TDD-LTE for data service and to TD-SCDMA for voice service.

Figure 4:
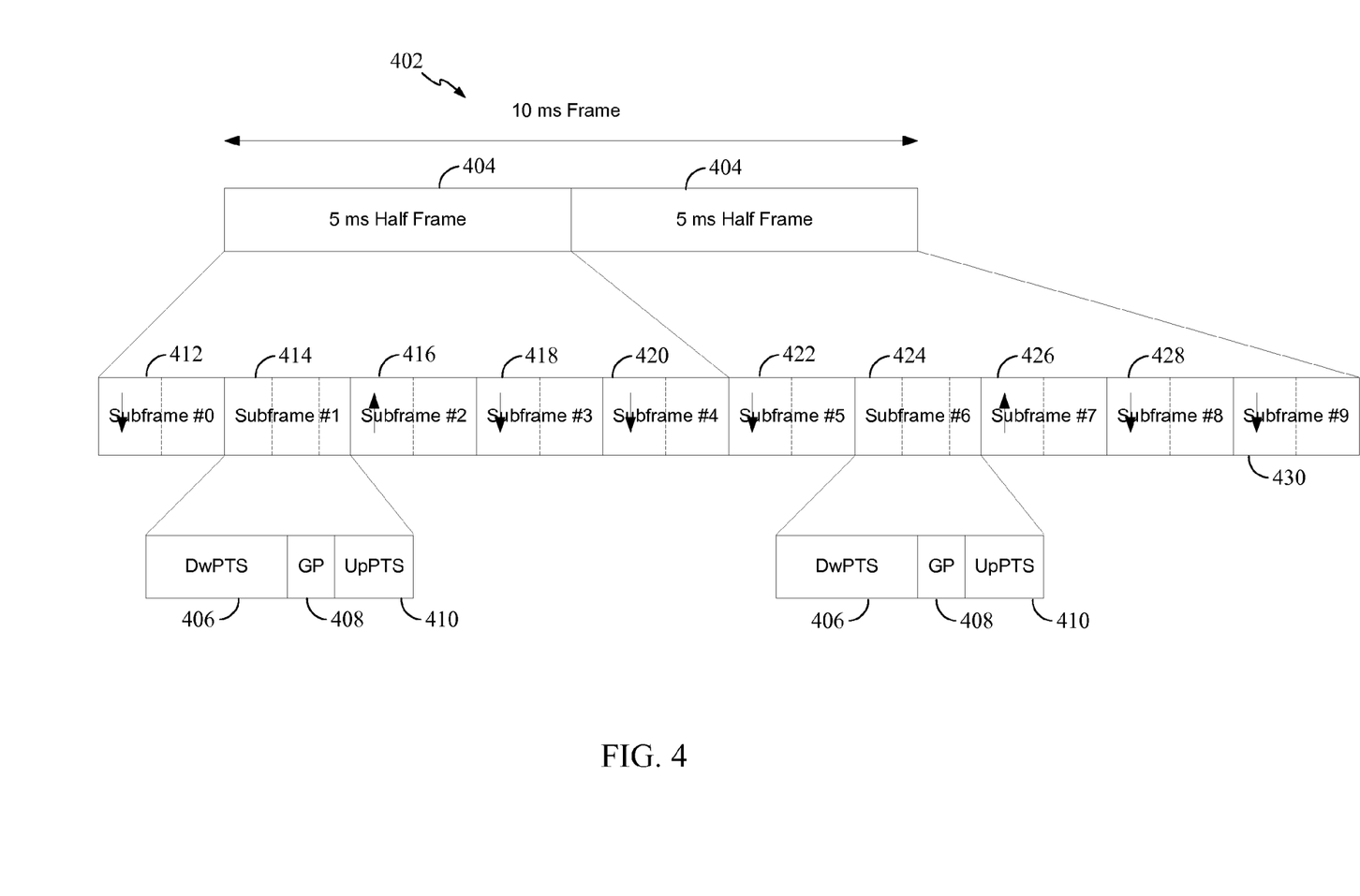
FIG. 4 is a block diagram conceptually illustrating an example of a frame structure in a telecommunications system.

FIG. 4 shows a frame structure for a TDD-LTE carrier. The TDD-LTE carrier, as illustrated, has a frame 402 that is 10 ms in length. Each radio frame has 307200 Ts, where T is the basic time unit of TDD-LTE. Each frame has two 5 ms half frames 404, and each of the half frames 404 includes five time subframes, giving each individual frame ten subframes, shown as subframe #0-subframe #9 (412-430). Each subframe can be either a downlink subframe (D), uplink subframe (U), or special subframe (S). Downlink subframes and uplink subframes can be divided into two slots, each of 0.5 ms. A special subframe may be divided into DwPTS (Downlink Pilot Timeslot), UpPTS (Uplink Pilot Timeslot), and gap period. Depending on configuration, the duration of DwPTS, UpPTS, and the gap period can vary.

As illustrated in FIG. 4, subframe #1 414 and subframe #6 424 are special subframes each with a DwPTS 406, gap period 408, and UpPTS 410. Subframes #0, 3, 4, 5, 8, and 9 (412, 418, 420, 422, 428, and 430) are downlink subframes and subframes #2 and 7 (416 and 426) are uplink subframes. This illustrated uplink-downlink configuration corresponds to TDD-LTE frame configuration 2. The following table shows the possible uplink-downlink configurations in TDD-LTE:

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Figure 5:
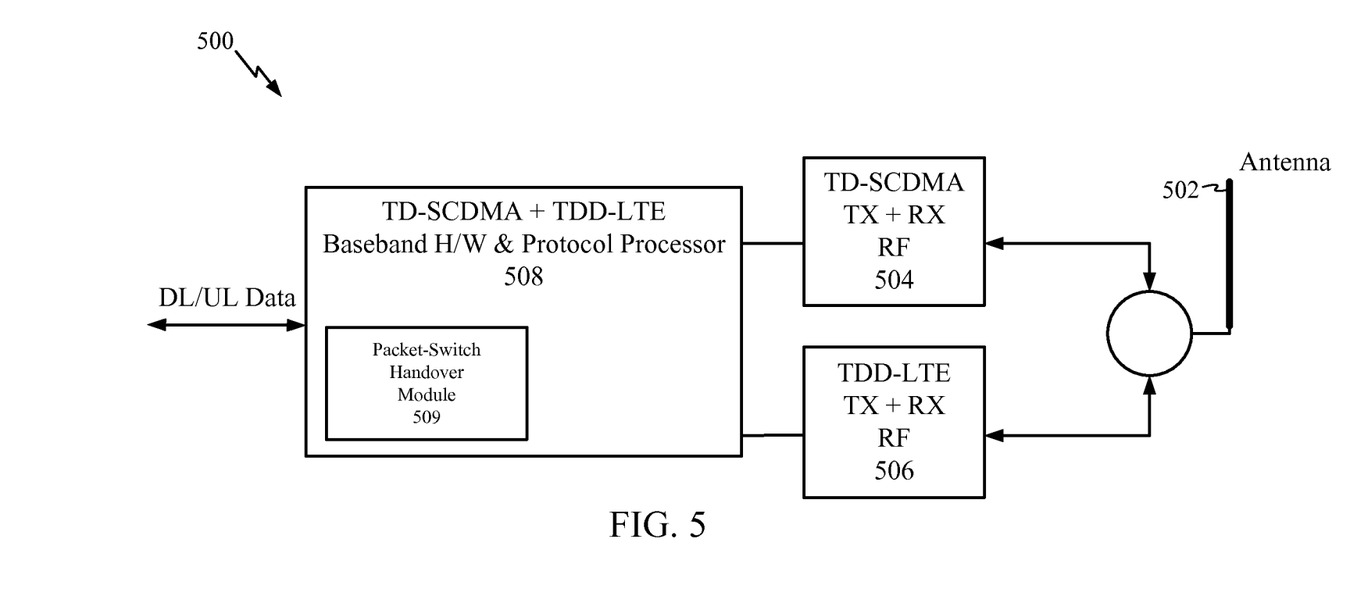
FIG. 5 is a block diagram illustrating a dual mode UE for implementing one aspect of the present disclosure.

Certain UEs may include dual mode hardware which enables simultaneous transmission and reception on two different radio access technologies (RATs). For example, a UE 500 employing the dual radio frequency (RF) chain hardware of FIG. 5 may engage in simultaneous transmission and reception on different radio access technologies. As shown in FIG. 5, signals from and to any base station are received and transmitted by the UE through an antenna 502. The signals are then processed by one of the UE's dual RF chains. Signals to/from a TD-SCDMA network may be handled by the RF chain of block 504. Signals to/from a TDD-LTE network may be handled by the RF chain of block 506. It is noted that the RF chains 504, 506 can be hardware (e.g., a circuit such as an application specific integrated circuit (ASIC), or discrete components), software or any combination of hardware and software. With the components shown in FIG. 5 a UE 500 may be able to simultaneously transmit or receive with one network while also transmitting or receiving with the other network. In another aspect, the UE 500 leverages the first and second RF chains 504, 506 to enable the UE 500 to concurrently communicate with a first and second network, for example, as described in greater detail in FIG. 8 with respect to TDD-LTE and TD-SCDMA. The architecture of FIG. 5 may make use of application specific integrated circuits (ASICs). The architecture of FIG. 5 may allow simultaneous voice and data operations. For example, the TDD-LTE chain 506 may be used for packet-switched (PS) data transmission and the TD-SCDMA chain may be used for circuit-switched (CS) communications. A protocol processor 508 is provided to process the received and transmitted data. A signal measurement scheduling module 509 may be included within the TD-SCDMA and TDD-LTE baseband hardware/protocol processor 508. The signal measurement scheduling module 509 can be hardware, software, or any combination of the two. High level functionality of the packet-switch handover module 509 is now described with respect to FIG. 6.

Figure 6:
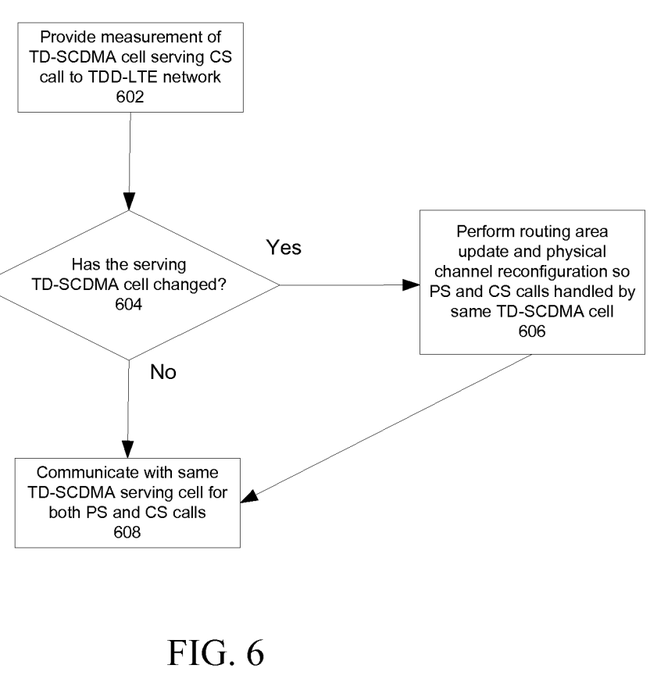
FIG. 6 is a flow diagram illustrating operation of a packet-switch handover module according to one aspect of the present disclosure.

As shown in block 602 of FIG. 6, the packet-switch handover module 509 directs a UE to provide the TDD-LTE network with a measurement of a TD-SCDMA cell presently serving the UE's circuit-switched call (hereinafter referred to as a current serving cell). The packet-switch handover module 509 then checks to see if the TD-SCDMA cell serving the UE's circuit-switched call has changed prior to handover of the UE's packet-switched call, as shown in block 604. If the serving cell has not changed, the UE continues with both its packet-switched and circuit-switched calls, now both served by the same TD-SCDMA cell, as shown in block 608. If the circuit-switched serving cell has changed, the packet-switch handover module 509 directs the UE to perform a routing area update and physical channel reconfiguration so the packet-switched call is handed over to the new TD-SCDMA cell serving the circuit-switched call, as shown in block 606. The UE then continues with both its packet-switched and circuit-switched calls, now both served by the same TD-SCDMA cell, as shown in block 608.

Figure 7:
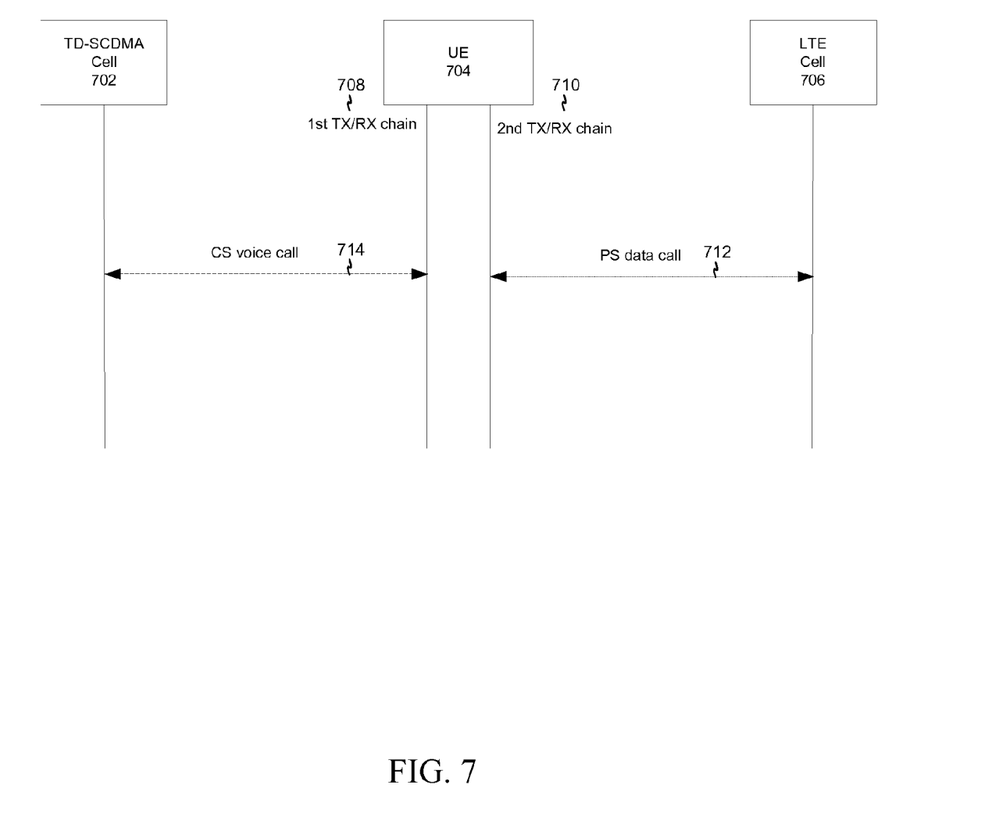
FIG. 7 is a call flow diagram illustrating UE dual mode operation.

Hardware configurations such as those illustrated in FIG. 5 allow simultaneous operations using two different radio access technologies. One typical scenario, in the case of a UE capable of operating on both TD-SCDMA and TDD-LTE networks, is a UE concurrently uses the TDD-LTE network for packet-switched data communications and the TD-SCDMA network for circuit-switched voice calls. A TDD-LTE network does not offer circuit-switched capability whereas a TD-SCDMA network offers both packet-switched and circuit-switched capability. Thus, if the UE is located where there is no coverage of the TDD-LTE network, the TD-SCDMA network can also offer the packet-switched data service. In the TD-SCDMA network, a packet-switched data call can use the High Speed Downlink Packet Access (HSDPA) and High Speed Uplink Packet Access (HSUPA) protocols. FIG. 7 shows a UE 704 engaged in simultaneous calls with the TDD-LTE network 706 and the TD-SCDMA network 702. A first transmit (TX)/receive (RX) chain 708 of the UE 704 (as also seen in FIG. 5 as RF chain 504) engages in a circuit-switched voice call 714 with the TD-SCDMA network 702 at the same time a second transmit (TX)/receive (RX) chain 710 (as also seen in FIG. 5 as RF chain 506) engages in a packet-switched data call 712 with the TDD-LTE network 706.

Figure 8:
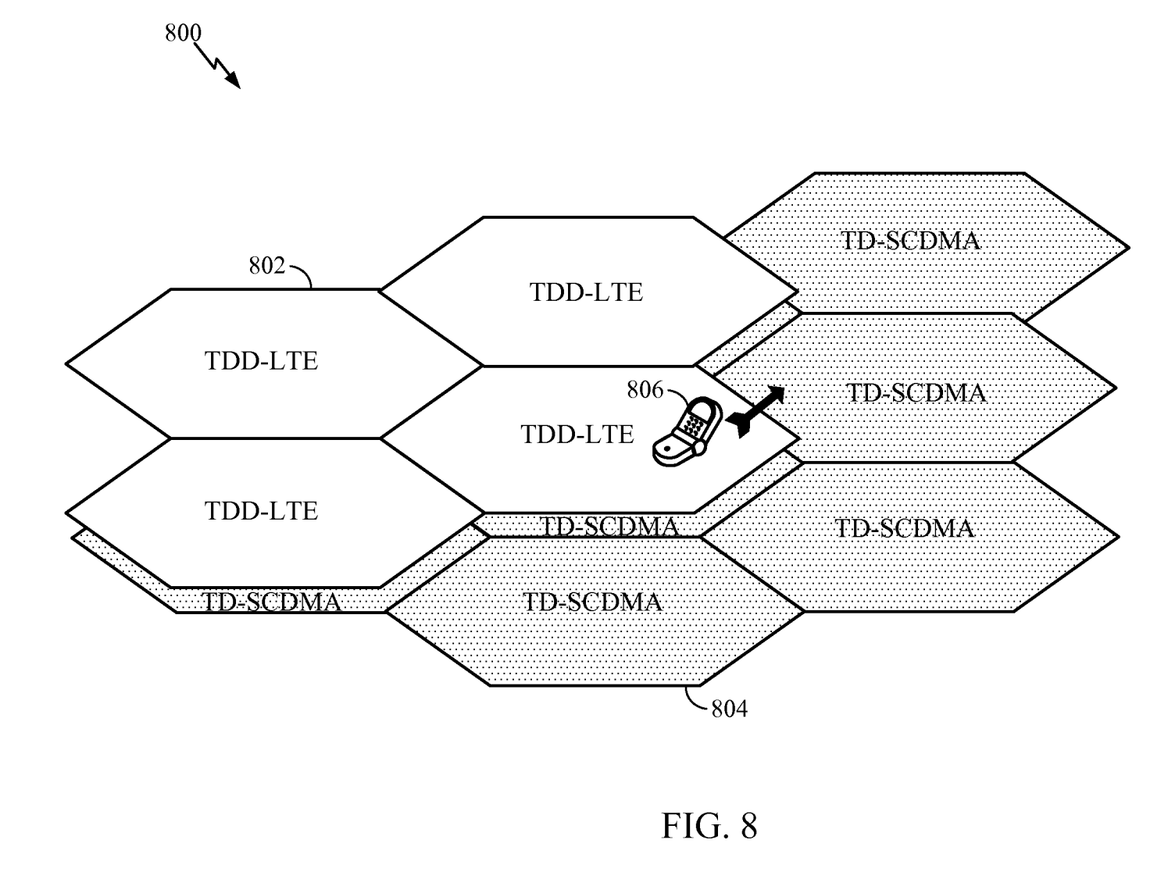
FIG. 8 is a diagram illustrating a UE travelling between coverage areas of a TDD-LTE network and a TD-SCDMA network.

When a UE is in dual mode operation, in certain scenarios the UE may move from an area with coverage for both networks into an area where there is only coverage for one network. Such a scenario is shown in FIG. 8. As illustrated, dual mode coverage 800 is shown for a TDD-LTE network 802 and a TD-SCDMA network 804. As shown, the UE 806 is moving from a cell area with dual network coverage into an area covered only by the TD-SCDMA network, 804. When both voice and data calls are ongoing in the TD-SCDMA and TDD-LTE networks respectively while the UE moves from dual mode coverage to single mode coverage, there is a need to handover the packet-switched (data) call from the TDD-LTE to TD-SCDMA network. It is presently not clear how such handover will occur.

Offered is a solution to this handover problem. Proposed is a new procedure to provide continuous operation handover for simultaneous voice and data calls in two networks (for example in TD-SCDMA and TDD-LTE respectively) to voice and data calls in a single network (for example, TD-SCDMA). The presented procedure is used to direct the handover such that the TD-SCDMA cell serving the UE's circuit-switched call is selected as the serving cell for the packet-switched call after the handover procedure. Without such a procedure, the TDD-LTE network may handover the packet-switched call to a different TD-SCDMA cell, which is undesirable.

Figure 9:
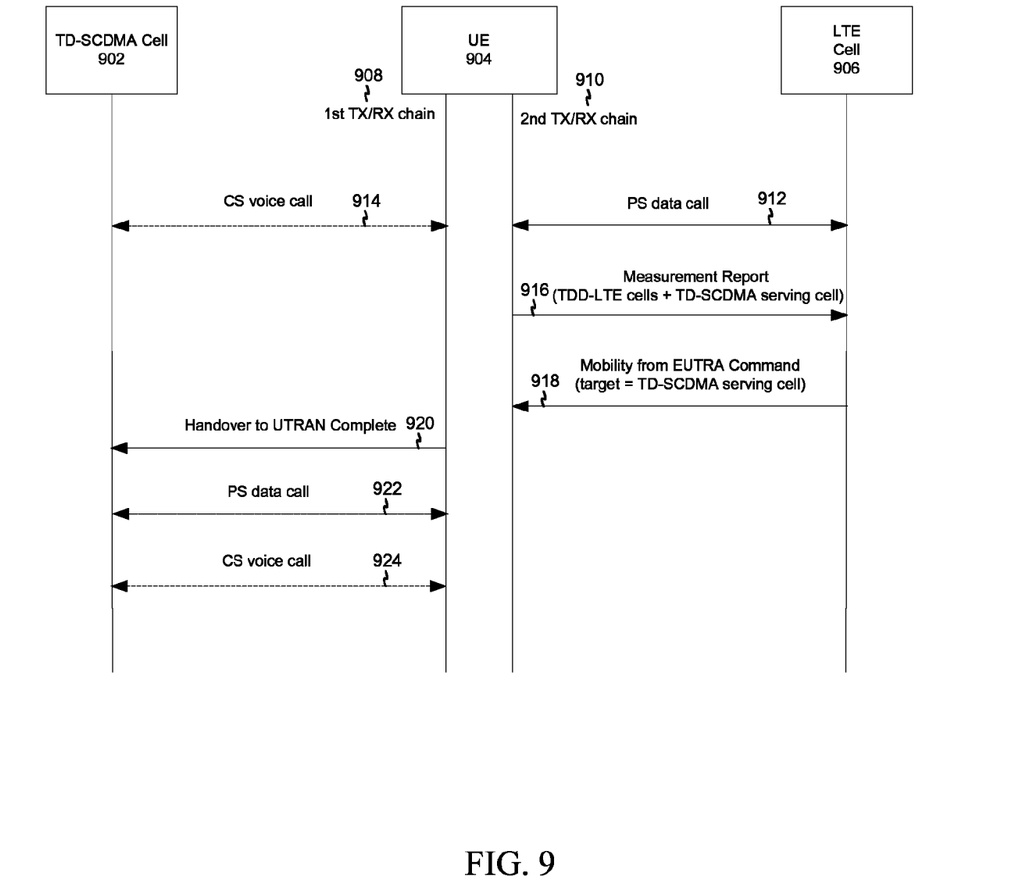
FIG. 9 is a call flow diagram illustrating handoff of a UE data call during dual mode operation according to one aspect of the present disclosure.

FIG. 9 illustrates a call flow according to one aspect of the present disclosure. As shown, a UE 904 employs a first transmit (TX)/receive (RX) chain 908 (as also seen in FIG. 5 as RF chain 504) to engage in a circuit-switched voice call 914 with a TD-SCDMA network 902. Simultaneously the UE 904 employs a second transmit (TX)/receive (RX) chain 910 (as also seen in FIG. 5 as RF chain 506) to engage in a packet-switched data call 912 with the TDD-LTE network 906. During a standard handover procedure from TDD-LTE to TD-SCDMA, a UE might report signal measurements with multiple TD-SCDMA cells to the TDD-LTE cell with a Measurement Report message. In the present aspect, the UE 904 only reports its current serving TD-SCDMA cell 902 to the TDD-LTE enhanced NodeB (cell) 906 with the Measurement Report message, as shown at time 916. This procedure may be used to ensure the TDD-LTE network performs handover of the UE 904 to the UE's current TD-SCDMA serving cell 902.

When the UE 904 is approaching the border of the coverage area of the TDD-LTE network, the TDD-LTE cell 906 will then send the UE 904 the Mobility from Evolved Universal Terrestrial Radio Access (EUTRA) Command instructing the UE 904 to handover to its current serving TD-SCDMA cell 902, as shown at time 918. The UE 904 then completes the packet-switch handover with its serving TD-SCDMA cell 902 Universal Terrestrial Radio Access Network (UTRAN), as shown at time 920. As the UE 904 already maintains a signaling connection with the TD-SCDMA network 902, the common random access procedures during connection may be skipped for the illustrated packet-switch handover setup. The UE's packet-switched call and circuit-switched call are then anchored to the same serving TD-SCDMA cell 902, as shown in times 922 and 924.

In certain situations, it may be possible that the above packet-switch handover procedure begins just as the UE is moving between TD-SCDMA serving cells and the UE's circuit-switched call is switched between a previous serving TD-SCDMA cell (hereinafter referred to as cell 1) and a new serving TD-SCDMA cell (hereinafter referred to as cell 2) before the packet-switch handover procedure completes. If the UE is aware during the packet-switch handover setup that it is about to handover its circuit-switched call as well, it may report its new TD-SCDMA cell measurements to the TDD-LTE cell so both of the UE's calls will end up being served by the same new TD-SCDMA cell. If the UE is not able to do so, and reports its old TD-SCDMA serving cell measurements during the packet-switch handover, the procedures described below and illustrated in FIG. 10 may be employed to anchor both the UE's packet-switched and circuit-switched calls to the same TD-SCDMA serving cell.

Figure 10:
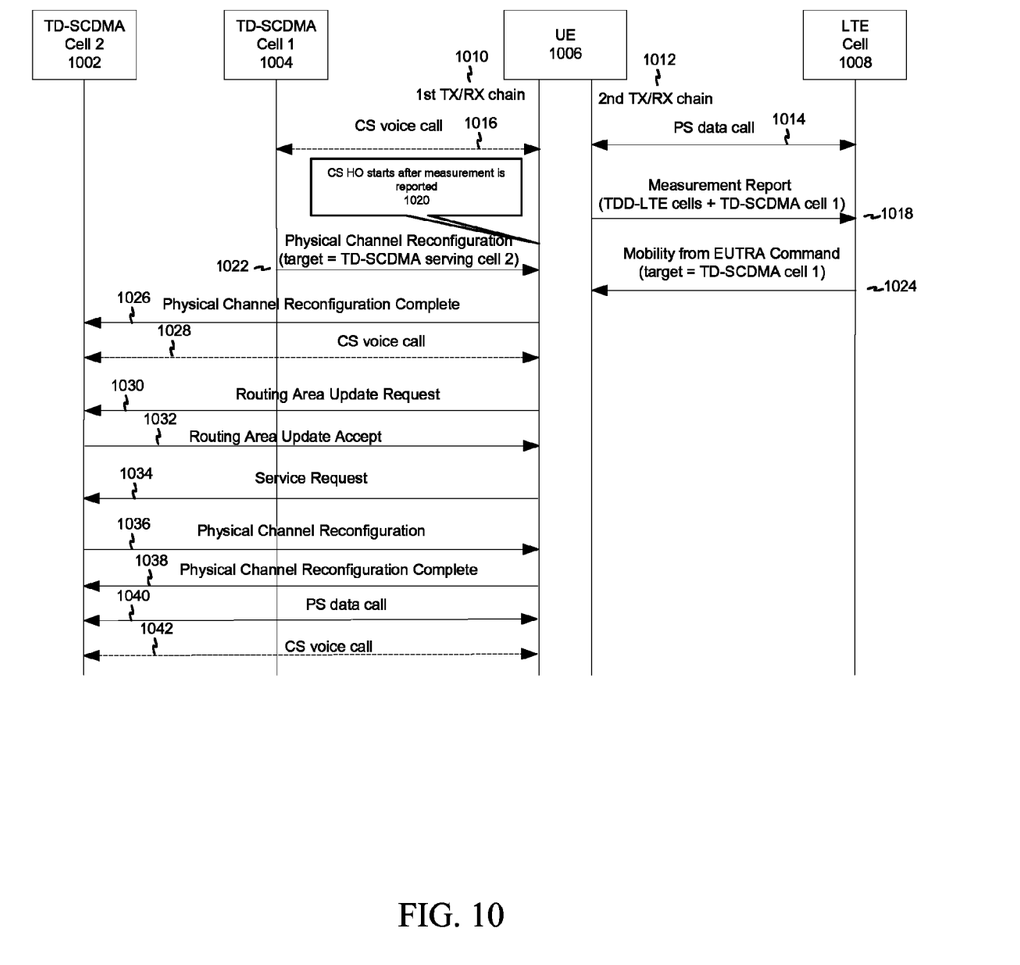
FIG. 10 is a call flow diagram illustrating improved handoff of a UE data call during dual mode operation according to one aspect of the present disclosure.

As shown in FIG. 10, a UE 1006 employs a first transmit (TX)/receive (RX) chain 1010 to engage in a circuit-switched voice call 1016 with a first TD-SCDMA cell 1004. Simultaneously, the UE 1006 employs a second transmit (TX)/receive (RX) chain 1012 to engage in a packet-switched data call 1014 with the TDD-LTE cell 1008. At time 1018 the UE 1006 provides a Measurement Report to the TDD-LTE cell 1008 containing the signal measurements for TD-SCDMA cell 1 1004. After that report, at time 1020, handover of the UE's circuit-switched call begins and a physical channel reconfiguration message is sent from TD-SCDMA cell 1 1004 to the UE 1006 indicating TD-SCDMA cell 2 1002 as the target. The UE 1006 completes the physical channel reconfiguration with TD-SCDMA cell 2 1002 as shown at time 1026 and the circuit-switch call of the UE 1006 is handed over to TD-SCDMA cell 2 1002 as shown at time 1028.

At some point during this circuit-switch handover, the UE 1006 receives the Mobility from EUTRA Command from the LTE-Cell 1008 indicating handover of the packet-switched call to TD-SCDMA cell 1 1004, as shown at time 1024. The UE 1006 performs a routing area update procedure with the new TD-SCDMA cell, TD-SCDMA cell 2 1002 as shown at times 1030 and 1032. This procedure will inform the TD-SCDMA network of the new location of the UE 1006. The UE 1006 then performs a service request procedure, as shown at time 1034, to resume the packet-switched data call. The UE 1006 and TD-SCDMA cell 2 1002 will then perform physical channel reconfiguration as shown at times 1036 and 1038, setting up the radio bearers for the packet-switched call. Once complete, TD-SCDMA cell 2 1002 will become the serving cell for both the circuit-switched call and the packet-switched call, as shown at times 1040 and 1042.

The procedures described above allow a UE with dual mode transmit/receive capability to perform packet-switched handover from TDD-LTE to TD-SCDMA during simultaneous voice and data calls with reduced impact on the network side.

In one configuration, the apparatus, for example the UE 350, for wireless communication includes means for communicating with a first radio access network during a call of a first call type. In one aspect, the aforementioned means may be the antennas 352 or 502, the transmit/receive hardware 504, the protocol processor 508, the receiver 354, the channel processor 394, the receive frame processor 360, the receive processor 370, the transmitter 356, the transmit frame processor 382, the transmit processor 380, the controller/processor 390, and/or the memory 392 configured to perform the functions recited by the aforementioned means. The UE 350 may also include means for communicating with a second radio access network during a call of a second call type. In one aspect, the aforementioned means may be the antennas 352 or 502, the transmit/receive hardware 506, the protocol processor 508, the receiver 354, the channel processor 394, the receive frame processor 360, the receive processor 370, the transmitter 356, the transmit frame processor 382, the transmit processor 380, the controller/processor 390, and/or the memory 392 configured to perform the functions recited by the aforementioned means. The UE 350 may also include means for sending the second radio access network a signal measurement for a serving cell of the first radio access network. In one aspect, the aforementioned means may be the antennas 352 or 502, the transmit/receive hardware 506, the packet-switch handover module 509, the protocol processor 508, the transmitter 356, the transmit frame processor 382, the transmit processor 380, the controller/processor 390, the memory 392, and/or the signal measurement scheduling module 391 configured to perform the functions recited by the aforementioned means. The UE 350 may also include means for receiving an indication from the second radio access network to communicate with the serving cell of the first radio access network for the call of the second call type. In one aspect, the aforementioned means may be the antennas 352 or 502, the transmit/receive hardware 504 or 506, the packet-switch handover module 509, the protocol processor 508, the receiver 354, the channel processor 394, the receive frame processor 360, the receive processor 370, the transmitter 356, the transmit frame processor 382, the transmit processor 380, the controller/processor 390, the memory 392, and/or the signal measurement scheduling module 391 configured to perform the functions recited by the aforementioned means. In another aspect, the aforementioned means may be a module or any apparatus configured to perform the functions recited by the aforementioned means.

Figure 11:
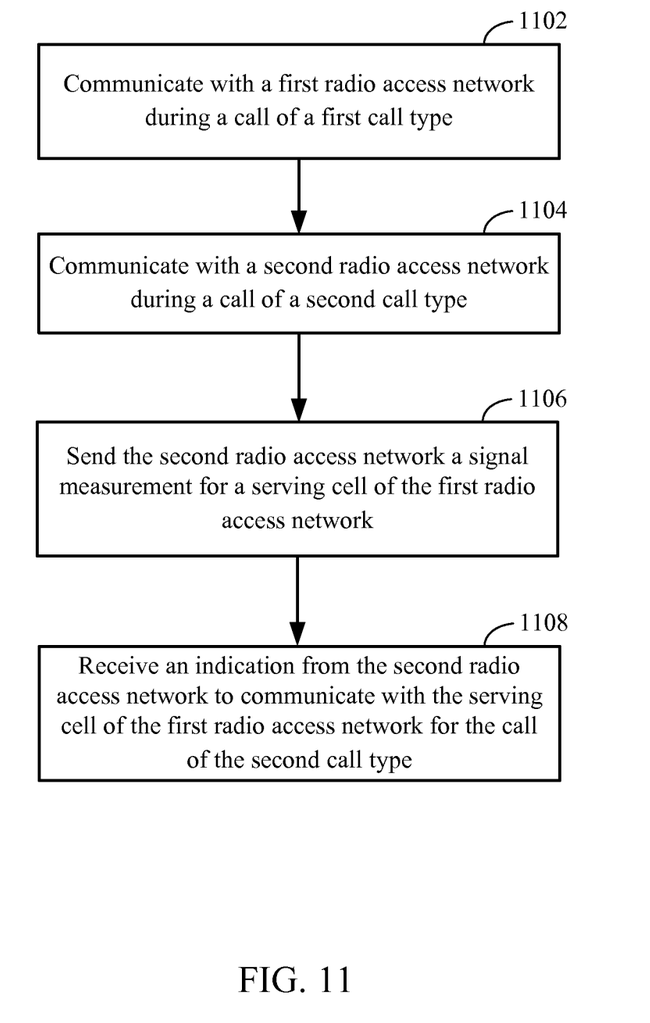
FIG. 11 is a functional block diagram illustrating example blocks executed to implement one aspect of the present disclosure.

As shown in FIG. 11 a UE may communicate with a first radio access network during a call of a first call type, as shown in block 1102. The UE may also communicate with a second radio access network during a call of a second call type, as shown in block 1104. The UE may send the second radio access network a signal measurement for a serving cell of the first radio access network, as shown in block 1106. The UE may receive an indication from the second radio access network to communicate with the serving cell of the first radio access network for the call of the second call type, as shown in block 1108.

Several aspects of a telecommunications system has been presented with reference to TD-SCDMA and TDD-LTE systems. As those skilled in the art will readily appreciate, various aspects described throughout this disclosure may be extended to other telecommunication systems, network architectures and communication standards. By way of example, various aspects may be extended to other UMTS systems such as W-CDMA, High Speed Downlink Packet Access (HSDPA), High Speed Uplink Packet Access (HSUPA), High Speed Packet Access Plus (HSPA+) and TD-CDMA. Various aspects may also be extended to systems employing FDD Long Term Evolution (LTE), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for wireless communication, comprising:
   communicating with a first radio access network during a call of a first call type;
   communicating with a second radio access network during a call of a second call type;
   sending the second radio access network a signal measurement for a serving cell of the first radio access network; and
   receiving an indication from the second radio access network to communicate with the serving cell of the first radio access network for the call of the second call type.

2. The method of claim 1 further comprising:
   determining when communications have terminated with the serving cell of the first radio access network upon receipt of the indication; and
   communicating with the serving cell of the first radio access network to handover the call of the second call type to a new serving cell of the first radio access network.

3. The method of claim 1 in which the first radio access network comprises a time division—synchronous code division multiple access (TD-SCDMA) network and the second radio access network comprises a time division duplexed—Long Term Evolution (TDD-LTE) network.

4. The method of claim 1 in which the first call type is a circuit-switched call and the second call type is a packet-switched call.

5. The method of claim 1 further comprising concurrently processing the call of the first call type and the call of the second call type.

6. The method of claim 1 further comprising communicating with the first radio access network with a first radio frequency chain and communicating with the second radio access network with a second radio frequency chain.

7. A user equipment configured for wireless communication, the user equipment comprising:
   means for communicating with a first radio access network during a call of a first call type;
   means for communicating with a second radio access network during a call of a second call type;
   means for sending the second radio access network a signal measurement for a serving cell of the first radio access network; and
   means for receiving an indication from the second radio access network to communicate with the serving cell of the first radio access network for the call of the second call type.

8. The user equipment of claim 7 further comprising:
   means for determining when communications have terminated with the serving cell of the first radio access network upon receipt of the indication; and
   means for communicating with the serving cell of the first radio access network to handover the call of the second call type to a new serving cell of the first radio access network.

9. The user equipment of claim 7 in which the first radio access network comprises a time division—synchronous code division multiple access (TD-SCDMA) network and the second radio access network comprises a time division duplexed—Long Term Evolution (TDD-LTE) network.

10. The user equipment of claim 7 in which the first call type is a circuit-switched call and the second call type is a packet-switched call.

11. A computer program product, comprising:
    a non-transitory computer-readable medium having program code recorded thereon, the program code comprising:
       program code to communicate with a first radio access network during a call of a first call type;
       program code to communicate with a second radio access network during a call of a second call type;
       program code to send the second radio access network a signal measurement for a serving cell of the first radio access network; and
       program code to receive an indication from the second radio access network to communicate with the serving cell of the first radio access network for the call of the second call type.

12. The computer program product of claim 11 in which the program code further comprises:
    program code to determine when communications have terminated with the serving cell of the first radio access network upon receipt of the indication; and
    program code to communicate with the serving cell of the first radio access network to handover the call of the second call type to a new serving cell of the first radio access network.

13. The computer program product of claim 11 in which the first radio access network comprises a time division—synchronous code division multiple access (TD-SCDMA) network and the second radio access network comprises a time division duplexed—Long Term Evolution (TDD-LTE) network.

14. The computer program product of claim 11 in which the first call type is a circuit-switched call and the second call type is a packet-switched call.

15. A user equipment configured for wireless communication, comprising:
- at least one processor; and
- a memory coupled to the at least one processor,
- the at least one processor being configured:
    - to communicate with a first radio access network during a call of a first call type;
    - to communicate with a second radio access network during a call of a second call type;
    - to send the second radio access network a signal measurement for a serving cell of the first radio access network; and
    - to receive an indication from the second radio access network to communicate with the serving cell of the first radio access network for the call of the second call type.

16. The user equipment of claim 15 in which the at least one processor is further configured:
- to determine when communications have terminated with the serving cell of the first radio access network upon receipt of the indication; and
- to communicate with the serving cell of the first radio access network to handover the call of the second call type to a new serving cell of the first radio access network.

17. The user equipment of claim 15 in which the first radio access network comprises a time division—synchronous code division multiple access (TD-SCDMA) network and the second radio access network comprises a time division duplexed—Long Term Evolution (TDD-LTE) network.

18. The user equipment of claim 15 in which the first call type is a circuit-switched call and the second call type is a packet-switched call.

19. The user equipment of claim 15 in which the at least one processor is further configured to concurrently process the call of the first call type and the call of the second call type.

20. The user equipment of claim 15 in which the at least one processor is further configured to communicate with the first radio access network with a first radio frequency chain and to communicate with the second radio access network with a second radio frequency chain.

\* \* \* \* \*